United States Patent
Hiroi

(10) Patent No.: US 6,384,846 B1
(45) Date of Patent: May 7, 2002

(54) METHODS AND APPARATUS FOR RENDERING MULTIPLE IMAGES USING A LIMITED RENDERING RESOURCE

(75) Inventor: Kazushige Hiroi, Cupertino, CA (US)

(73) Assignee: Hitachi America Ltd., Tarrytown, NY (US)

( * ) Notice: Subject to any disclaimer, the term of this patent is extended or adjusted under 35 U.S.C. 154(b) by 0 days.

(21) Appl. No.: 09/252,709

(22) Filed: Feb. 18, 1999

Related U.S. Application Data
(60) Provisional application No. 60/112,030, filed on Dec. 11, 1998.

(51) Int. Cl.$^7$ .................................................. G06F 3/00
(52) U.S. Cl. ...................... 345/794; 345/637; 345/619; 345/795; 345/629
(58) Field of Search ................................ 345/781, 782, 345/473, 653, 654, 638, 619, 614, 637, 794, 795, 629

(56) References Cited

U.S. PATENT DOCUMENTS

| | | | | |
|---|---|---|---|---|
| 4,845,644 A | | 7/1989 | Anthias et al. ............. | 364/521 |
| 5,351,129 A | * | 9/1994 | Lai .............................. | 348/584 |
| 5,479,497 A | * | 12/1995 | Kovarik ...................... | 379/265.03 |
| 5,613,057 A | * | 3/1997 | Caravel ....................... | 707/500.1 |
| 5,781,195 A | * | 7/1998 | Marvin ........................ | 345/428 |
| 5,841,439 A | * | 11/1998 | Pose et al. ................... | 345/439 |
| 5,883,639 A | * | 3/1999 | Walton et al. ............... | 345/473 |
| 5,943,050 A | * | 8/1999 | Bullock et al. ............. | 345/783 |
| 6,054,987 A | * | 4/2000 | Richardson et al. ........ | 345/734 |
| 6,184,882 B1 | * | 2/2001 | Coley et al. ................ | 345/797 |
| 6,191,799 B1 | * | 2/2001 | Purdy .......................... | 345/473 |
| 6,232,474 B1 | * | 5/2001 | Horvitz et al. .............. | 549/295 |

FOREIGN PATENT DOCUMENTS

| | | |
|---|---|---|
| EP | 0 537 030 A2 | 4/1993 |
| JP | SP 10154060 | 6/1998 |
| JP | 10-154060 | 6/1998 |

* cited by examiner

*Primary Examiner*—Raymond J. Bayerl
*Assistant Examiner*—Thomas J Joseph
(74) *Attorney, Agent, or Firm*—Straub & Pokotylo; Michael P. Straub

(57) ABSTRACT

The present invention addresses decoding and simultaneously displaying multiple images in different windows of a PC or other display device such as a television set. When more than two images are displayed, if the total processing load associated with decoding all of the images to be displayed is over 100%, then decoding priority is decided for each image as a function of display window size. By decoding and displaying images according to this priority, the user can view a desired image, e.g., a main picture image smoothly and comfortably, while other images displayed in smaller sub-windows may only be partially decoded during each frame time. When windows are of the same size, decoding priority is determined between the windows of the same size, as a function of the amount of decoder resources required to decode each image. As the amount of decoder resources needed to decode and image to be displayed in a window of a given size increases, the decoder priority is decreased relative to images which are to be displayed in the same size window. In one embodiment, the image assigned the highest decoding priority is always fully decoded while only portions of the other images may be decoded. The percentage of an image which is decoded will normally be lower for images with relatively low decoding priority than for images with relatively high decoding priority.

32 Claims, 3 Drawing Sheets

| ORIGINAL IMAGE SIZE (202) || DISPLAYED WINDOW SIZE (204) || CPU LOAD (206) |
|---|---|---|---|---|
| HORIZONTAL | VERTICAL | HORIZONTAL | VERTICAL | |
| Ox1 | Oy1 | Dx1 | Dy1 | L1 ← 208 |
| Ox2 | Oy2 | Dx2 | Dy2 | L2 ← 210 |
| . | . | . | . | . |
| . | . | . | . | . |
| . | . | . | . | . |

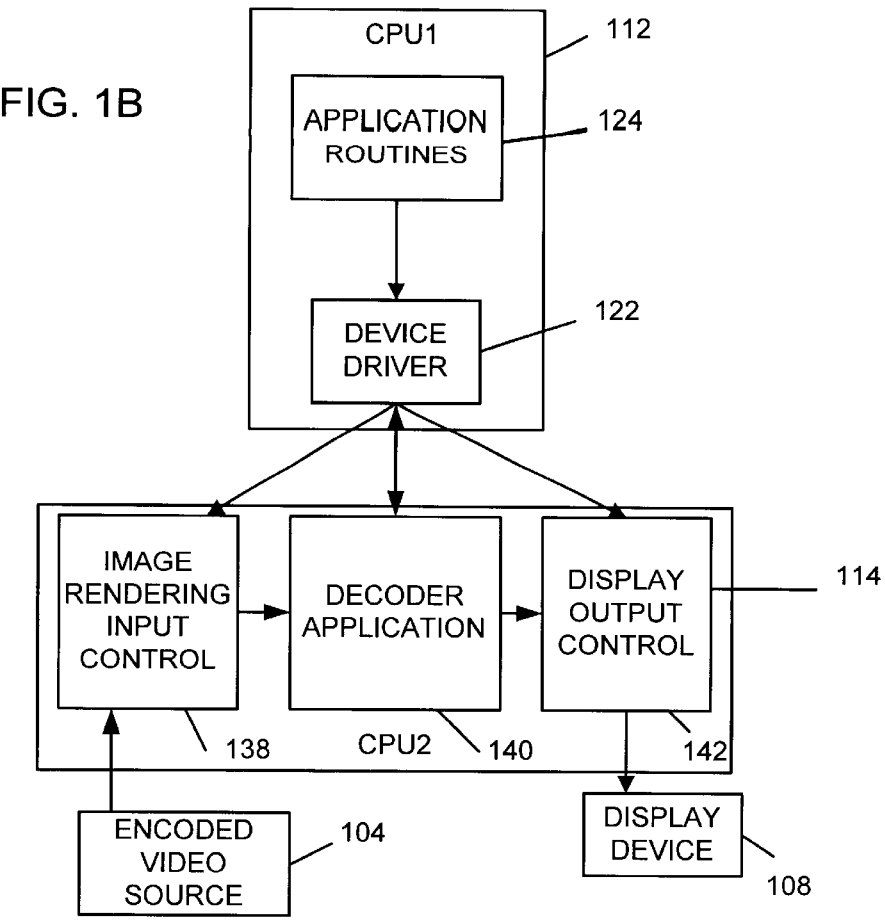

METHODS AND APPARATUS FOR RENDERING MULTIPLE IMAGES USING A LIMITED RENDERING RESOURCE

RELATED APPLICATIONS

This application claims the benefit of U.S. provisional patent application No. 60/122,030 filed Dec. 11, 1998.

FIELD OF THE INVENTION

The present invention relates to resource allocation, and more particularly to methods and apparatus for allocating image rendering resources, e.g., a CPU used to decode multiple images.

BACKGROUND OF THE INVENTION

Video devices, such as television sets and personal computers, often process and then simultaneously display multiple images on a single display screen. For example, a computer may display multiple windows with a different image being displayed in each window. Television sets, e.g., with picture-in-picture capability, are another example of a device which processes and then simultaneously displays multiple images.

Image rendering, i.e., the processing of image data to prepare an image for display on a display device, often requires a substantial amount of resources. For example, image rendering may involve the use of a video decoder, bus, memory and/or CPU resources. A large number of processing operations involved in rendering most images. Accordingly, given a limited set of resources, it may not be possible to fully decode and display on a single screen, in real time, as many images as might be desired. The problem of limited image processing resources is particularly noticeable when attempting to simultaneously render and display large numbers of video images in real time.

The lack of unlimited processing resources to support multiple image decoding operations creates a need for methods and apparatus for determining how image rendering resources should be allocated. This is particularly the case when demands for available image processing resources exceed the available supply.

Accordingly, there is a need for methods and apparatus for determining which one of a plurality of image should be given image rendering priority when multiple images are being rendered for display on a single screen and there are insufficient resources to fully render all of the images. In the case of video decoding implemented using e.g., a CPU and/or a bus, this may involve determining which one of a plurality of images should be given decoding priority in terms of CPU and/or bus access.

BRIEF DESCRIPTION OF THE DRAWINGS

FIG. 1B illustrates, from a control and data flow perspective, the relationship between various components of the system of FIG. 1A.

FIG. 2 illustrates a database of image rendering load information used in accordance with various embodiments of the present invention.

SUMMARY OF THE INVENTION

Figure 1A:
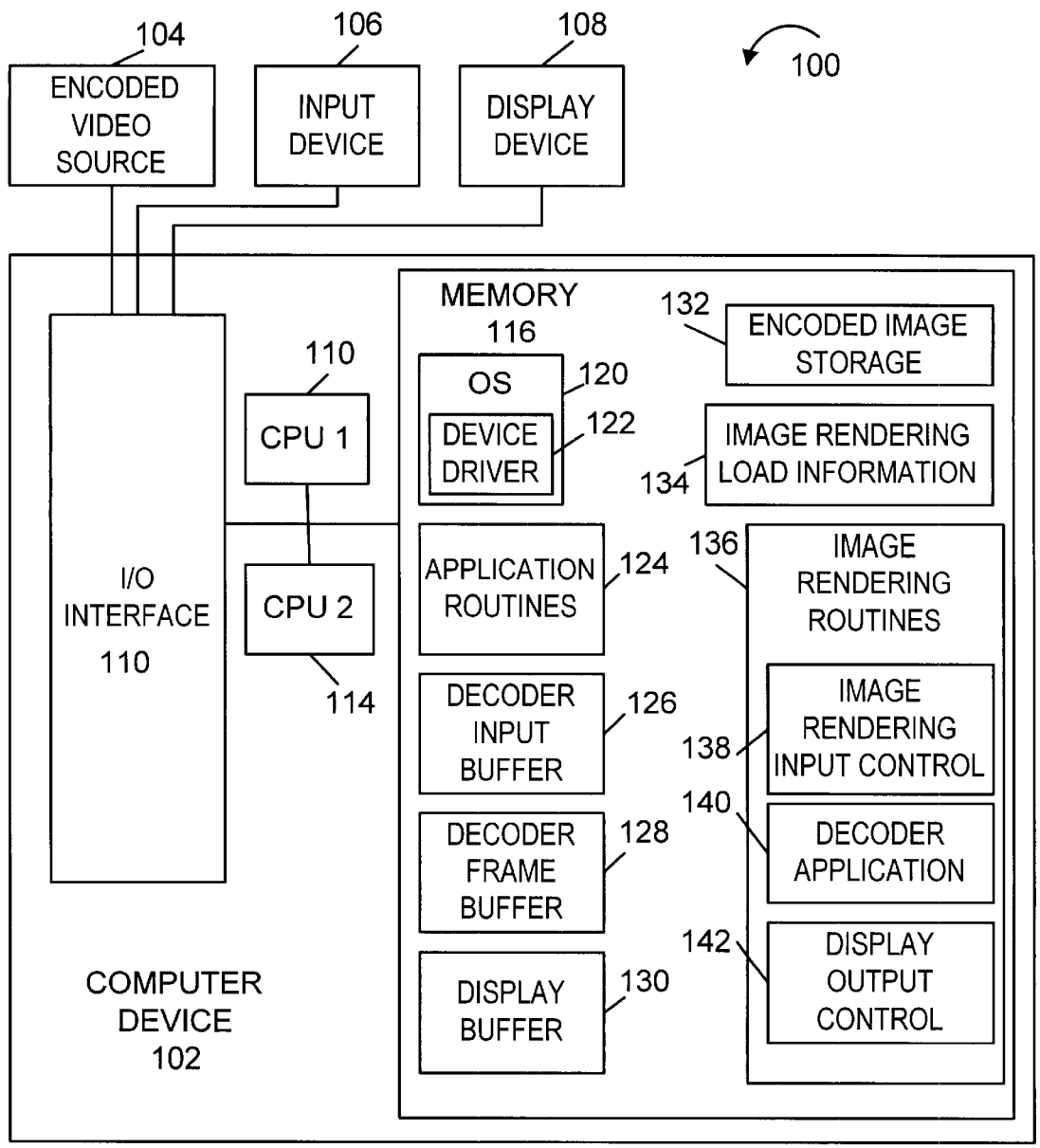
FIG. 1A illustrates a computer system implemented in accordance with the present invention.

The present invention relates to methods and apparatus for allocating limited resources available for rendering images.

In accordance with one embodiment of the present invention, user input is used in determining the priority, in terms of resource allocation, to be used in decoding multiple images.

In the case where a user has not provided image rendering resource allocation information, the system of the present invention automatically allocates available resources between different images to be rendered and displayed on the same screen.

In one embodiment, when two or more images are to be displayed on a single screen, the priority, in terms of rendering resource allocation, for each image, is decided according to the size of window in which the image will be displayed. In one embodiment of the present invention, images which are displayed in large windows are allocated a higher priority, in terms of rendering resource allocation, than images displayed in smaller windows.

In this context, being assigned a higher priority, in terms of image rendering resource allocation, means that a larger percentage of the image assigned the higher priority will be decoded than an image which is assigned a lower priority.

In one specific embodiment, the image assigned the highest priority is fully rendered, e.g., decoded, while images assigned a lower priority may only be partially decoded or not decoded at all. In the case of motion video, assuming that window sizes remain unchanged, this insures that the image in the largest window will be fully decoded while images in the smaller windows may only be partially decoded or decoded some of the time, e.g., every other frame or when significant scene changes are detected. Thus, one embodiment of the present invention focuses on completely rendering images in what may be described as the main window. Less importance is placed on the decoding of images corresponding to smaller windows, e.g., sub-windows in which PIP images are displayed. The smaller the window, the less frequently the displayed image is likely to be updated.

In one embodiment of the present invention, if images are displayed in the same size window, and a user has not entered priority information, image rendering priority is decided according to the relative amount of resources required to render each image. The image which consumes less rendering resources is assigned the higher priority in one such embodiment. For example, if first and second windows were of the same size and a first image to be displayed in the first window would require 25% more CPU time to decode than a second image to be decoded and displayed in a second window, image rendering priority would be given to the second image. This would result in a greater percentage of the second image being decoded and displayed than the first image, i.e., all of the second image may be processed and displayed while only a portion of the first image. Alternatively, assuming that images are being fully rendered, a larger number of images can be rendered since priority is given to rendering of the images which require fewer resources to render.

In the case of motion video, e.g., MPEG2 data streams, decoding priority is assigned on a per window or per data stream basis. The larger the window in which the decoded image data is to be displayed the higher the decoding priority assigned the data stream. Data streams which are to be decoded and displayed in the same size window are assigned decoding priority as a function of window size and the amount of decoder resources required to decode a the images in the data stream.

In one specific embodiment all of the windows in the largest data stream are decoded providing full motion video. In data streams assigned lower decoding priority decoding of some images is skipped. Skipping of B frames is preferred. Skipping of P frames is performed when there are insufficient resources to decode I and P frames in a data stream. Skipping of I frames when there is insufficient resources to decode I and P frames in a data stream. In such an MPEG embodiment, preference is given to decoding I and P frames since these are used as reference frames. Entire frames are decoded in the case of motion video when the possibility of the frame being used as a reference frame exists.

Additional methods and apparatus of the present invention are discussed below.

DETAILED DESCRIPTION

FIG. 1A illustrates a computer system 100 which may be used, in accordance with the present invention, to render and then simultaneously display multiple images.

As illustrated in FIG. 1A, the system 100 comprises a source of encoded video 104, an input device 106, a display device 108 and a computer device 102. The video source 104, input device 106, and display device 108 are coupled to an input/output (I/O) interface 110 of the computer 102. The interface 110 allows the computer device 102 to send and receive data.

The video source 104 may be, e.g., a digital video database, an Internet connection, or television receiver/tuner. The input device 106 may comprise, e.g. a standard computer keyboard. The display device 108 may comprise a conventional monitor.

The computer device 102 comprises the I/O interface 110, first and second CPUs 112, 114 and a memory device 116. The I/O interface 110 interfaces between the various components of the computer device 102 and the external components 104, 106, 108 coupled thereto.

While the memory 116 is illustrated as a single device, it may comprise RAM, ROM, a disk drive and/or a variety of other digital storage media. The memory 116 is used to store a computer operating system, OS 120, application software 124, image rendering load information 134, and a plurality of image rendering routines 136. The image rendering routines include an image rendering input control routine 138, a decoder application 140 and a display output control routine 142.

The operating system 120 is responsible for controlling the general operation of the computer device 102 and the interaction of various components included therein and/or coupled thereto. The OS 120 includes a device driver which is responsible for controlling the rendering of images to be displayed on the display device 108. Application software 124 includes, e.g., word processing programs, MPEG-2 viewers, JPEG viewers, etc. Image rendering load information 134 represents a database of information. The information relates to images which are to be displayed on the display device 108 and includes data on the amount of rendering resources required to display the images. The image rendering load information 134 will be discussed in greater detail with regard to FIG. 2.

The image rendering routines 136, include an image rendering input control routine 138, a decoder application 140 and a display output control routine 142. As will be discussed below, the image rendering routines control the processing and preparation of image data for display on the display device 108.

In addition to the above discussed routines and data, the memory 116 also includes a decoder input buffer 126, a decoder frame buffer 128 and a display buffer 130. The decoder input buffer 126 is used for temporarily storing encoded image data to be rendered. The decoder frame buffer 128 is used for storing reference frame data used during the decoding of encoded image data. The display buffer is used for storing data representing multiple images which is to be output to the display device 108 and displayed on a single screen.

FIG. 1B illustrates, from a control and data flow perspective, the relationship between various components of the system of FIG. 1A. In the FIG. 1A and 1B embodiments, the first CPU, CPU 112, is responsible for executing application routines 124 and the operating system routine 120. The second processor, CPU 114, is responsible for performing image rendering operations. CPU 114 may be located on, e.g., a video card or MPEG decoder card, which is part of the computer device 102.

Arrows in FIG. 1B are used to illustrate the passage of data and/or control information between components of the system 100.

Application routines 124 may include, e.g., an MPEG movie viewer and/or other software which processes and/or renders images for display on the display device 108. In FIG. 1B, application routines 124, which run on the first CPU 112, receive requests from users to render image data, e.g. encoded MPEG 2 images. The image rendering requests are passed to the device driver 122 which insures that the images being rendered are output in a format that can be displayed by the display device 108. When a variety of display devices are supported, different device drivers may be used for each one of the supported display devices.

Application routines 124 generate window size and position information which indicates which images should be displayed on the display, where they should be displayed, and the size of the window in which they are to be displayed. Using this information, device driver 122 controls the image rendering input control routine 138, decoder application 140, and display output control application 142, which are executed by the second CPU 114. Different decoding priorities may be assigned by the device driver 122 to different images as a function of the window in which the image will be displayed. Image rendering input control routine 138 is responsible for receiving images from the encoded video source 104. The control routine 138 buffers the encoded data in the decoder input buffer prior to processing by the decoder application 140.

The decoder application 140, processes, e.g., decompresses, the received encoded images. The decoder application 140 uses the decoder frame buffer 128 for storing data, e.g., decoded reference frames. The stored frames are used for performing motion compensated predictions during decoding. Decoded image data is passed from the decoder application 140 to the display output control routine 142. The display output control routine 142 processes the images output by the decoder for display in windows, having the position and size specified by the application routine 124. The window size and location in which individual images are displayed may be defined by a user of the system 100 via input device 106. The display, e.g., frame, buffer 130 is used by the display output control routine 142 to buffer the data corresponding to multiple windows which are to be displayed at the same time on the display device 108. Once processed by the display output control routine 142, the data representing rendered images to be displayed is transferred to the display device 108.

In this system, when two or more images are displayed, the device driver 122 receives from the application routines 124 information on the size of the window in which each image will be displayed.

In cases where the user has not specified the decoding priority to be assigned to the images of different windows, the device driver automatically defines the decoding priority of each image as a function of the size of the window in which the image is being displayed. In one embodiment, the larger the window in which an image is to be displayed, the higher the decoding priority assigned to the image. In one specific embodiment, the image to be displayed in the largest window is assigned a sufficiently high decoder priority that it will be fully decoded by the decoder application 140. Thus, full image decoding and full motion imagery can be insured in the main picture area while only partial image decoding may be achieved in smaller windows due to limited decoder resources, e.g., limited availability of the second CPU 114 or a bus for supplying data thereto.

As discussed above, the user can define decoding priorities by using the input device 106 to set various display options in the application routines 124. In the case of used defined decoding priority levels, the application routines 124 propagate these priorities to the device driver 122.

In some embodiments, a database, e.g., image rendering load information 134, is maintained and utilized by the device driver 122 in determining decoding priorities. The image rendering load information 134 includes information relating to the amount of rendering resources, e.g., the CPU load, required to render images associated with various display windows.

FIG. 2 illustrates exemplary contents of an image rendering load information database 134. As illustrated the database 134 comprises a series of rows 208, 210 of information, each row corresponding to a different picture window. For example, row 1 208 corresponds to a first window, row 2 210 to a second window, etc. The original size of an encoded image and the size of the window in which the image is to be displayed can affect the amount of processing required to render an image for display. Accordingly, each row, 208, 210 includes original image size information 202, in terms of the image's original horizontal and vertical dimensions. Each row 208, 210 also includes information 204, in the form of horizontal and vertical window size dimensions which indicate the size at which an image is to be displayed. The amount of processing required by the second CPU 114, to fully render the image for a window is stored in the last column 206 of the database. The CPU load may be expressed in time, or as a percentage of a fixed unit of time. The percentage being the portion of the fixed unit of time required to render the image. The fixed unit of time may be a frame time, e.g., the time used to display one frame of a motion image. In various video embodiments a frame time is 1/30 of a second.

Thus, as illustrated in FIG. 2, in one embodiment the database 134 comprises original size information, displayed size information, and CPU load information for each image to be displayed on the displayed device 108. The device driver 122 obtains the original size of the images from decoder application 140, and obtains the displayed size of images from the application routines 124. In one embodiment, the CPU load information included in the database 134 is then calculated by the operating system 120.

For each display period, e.g., frame time, the total rendering load, e.g., the total load on the second CPU 114 is determined by device driver 122. This is done by adding up the load in column 206 associated with each image to be rendered and simultaneously displayed on the display screen.

If the total rendering load associated with the second CPU 114 is determined to be over 100%, image rendering priority is determined as a function of window size with the images to be displayed in the larger windows being given higher priority than images to be displayed in smaller windows. When determining rendering priority with regard to images to be displayed in equal sized windows, the device driver assigns decoding priority, from highest to lowest priority, to the images which constitute the smallest to the largest load. That is, an image requiring very little rendering resources would be assigned a higher decoding priority than an image requiring a large amount of rendering resources, e.g., CPU 2 processing time.

In the context of the present application the higher the decoding priority, the larger the percentage of the image which will be decoded.

Figure 3:
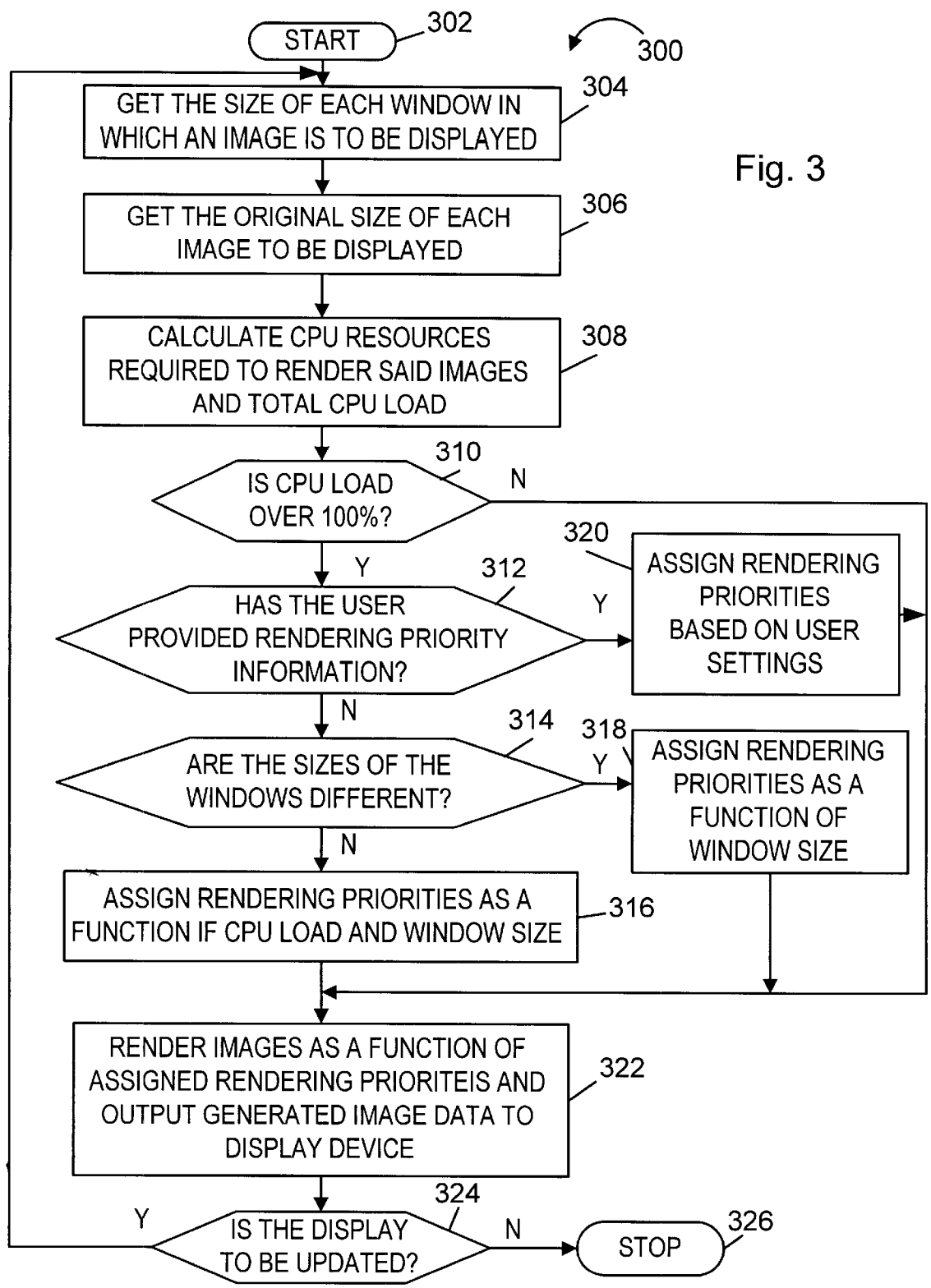
FIG. 3 is a flow chart illustrating how image priority is determined, in accordance with the present invention, when rendering multiple images to be displayed simultaneously on a single screen.

FIG. 3 shows the flow chart which indicates the algorithm for driver software to decide the rendering priority for images.

A method for determining image rendering priority, in accordance with one exemplary embodiment of the invention, is illustrated in FIG. 3. The process illustrated in FIG. 3 is implemented by the first CPU 112.

As shown in FIG. 3, the rendering priority allocation processes beings in START step 302 wherein the various applications associated with image rendering begin execution by the first and second CPUs 112, 114.

Operation proceeds from step 302 to step 304, wherein the device driver 122 gets the size of each window in which an image is to be displayed from the application routines 124. Next, in step 306, the device driver obtains, e.g., from decoder application 140, the original size of each image to be rendered. The order of steps 304 and 306 is not important and these steps may be performed in parallel.

Once the display window size and image size information is obtained, in step 308, the device driver 122 determines the rendering resources, e.g., load on CPU 2 114, required to render each of said images for display and the total load that will be imposed by rendering all the images which are to be simultaneously displayed on a screen.

In step 310, a determination is made as to whether the calculated total load associated with rendering the images exceeds 100%. That is, a determination is made as to whether or not the second CPU 114 can render all of the images which are to be displayed in the limited amount of time which is available for the task.

If the total calculated load does not exceed 100%, i.e., all of the images to be simultaneously displayed can be fully rendered, operation proceeds to step 322. In step 322 the images are rendered and the generated data is output to the display device 108. From step 322 operation proceeds to step 324.

If, in step 310, the total calculated rendering load exceeds the available capacity, i.e., all of the images to be simultaneously displayed can not be fully rendered in the available amount of time, operation proceeds from step 310 to step 312.

In step 312, the device driver 122 makes a determination as to whether or not the user of the system 100 has provided rendering priority information. If the user has provided such information, operation than proceeds to step 320 wherein rendering priorities are assigned to the different images to be rendered as a function of the user provided information, e.g., user settings. From step 320 operation proceeds to step 322.

If, in step 312, it is determined that the user has not provided rendering priority information, operation proceeds from step 312 to step 314. In step 314 the size of the windows in which the images are to be displayed is examined to determine if the window sizes are different from each other. Images corresponding to windows of the same size are then processed via step 316 while images corresponding to different size windows are processed via step 318.

In step 318 the device driver 122 assigns rendering priorities to images proceeds via this step as a function of the size of the windows in which the images will be displayed. The larger the window to which an image corresponds, the higher the assigned priority. The image corresponding to the largest window being assigned the highest rendering priority. From step 318, operation proceeds to step 322.

In step 316, images are assigned rendering priorities as a function of the CPU load associated with rendering the image and the size of the window in which the image is to be displayed. Images requiring greater amounts of CPU load to render are assigned correspondingly lower priorities than images which are to be displayed in the same size window but require less CPU time to render. The rendering priorities assigned in step 316 fall between the priorities assigned to images in step 318 which correspond to larger and smaller windows than the images being processed via step 316.

From step 316, operation proceeds to step 322 wherein the images are rendered, e.g., by the second CPU 114, and the data corresponding to the rendered images is output to the display device 108.

With the rendering of a set of images to be displayed simultaneously on a display device, operation proceeds from step 322 to step 324.

In step 324, a determination is made as to whether or not the display is to be updated. In the case of the display of motion video the images displayed on the screen of the display device will normally be updated with every image frame. Thus, the display may be updated, e.g., every 1/30 of a second.

If, in step 324, it is determined that the display is to be updated, operation proceeds to step 304. The image rendering process of the present invention is then be repeated with a new set of encoded image data. If however, the display is not to be updated further, operation proceeds from step 322 to step 326 wherein the routine 300 is terminated.

The methods and apparatus of the present invention may be used in computer systems which display multiple images on a single display screen, television sets which simultaneously display multiple images and/or in a host of other display applications.

In the case of decoding and displaying the images corresponding to multiple MPEG2 data streams, decoding priority may be assigned as discussed above as a function of the size of windows in which the decoded images are to be displayed. However, rather than assigning decoding priority on a per image basis, decoding priority is assigned on a per window or per data stream basis. In such an embodiment, the data base 134 may include information on the CPU load associated with decoding a group of pictures (GOP) corresponding to a particular window or images to be decoded in a preselected interval of time.

In one such embodiment decoding priority relates not to the percentage of an individual image which will be decoded but to the percentage of images, e.g., frames, in each data stream that will be decoded. As is known in the art, MPEG data streams normally include intra-coded (I) frames, predictively coded (P) frames and bi-directionally coded (B) frames. In one embodiment, entire frames are decoded and displayed regardless of the decoding priority assigned to each data stream. However, data streams which are assigned a lower decoding priority have fewer of their frames decoded and displayed than data streams assigned a higher priority. Where frames are to be dropped due to the limited decoding priority, B-frames are dropped first. If the remaining frames in a data stream still all can not be decoded, at least some P-frames are dropped. If, after dropping all the B and P-frames in a data stream, all the I frames still can not be decoded, than at least some of the I frames are dropped from the data stream being decoded. In one such embodiment, the data stream assigned the highest priority for being decoded in the main, i.e., largest picture window, is fully decoded, while data streams corresponding to smaller windows are only partially decoded. In one particular embodiment, only the intra-coded frames in the data stream corresponding to the smallest window are decoded and displayed while all the frames in the largest window are displayed. In another embodiment where decoding resources are extremely limited a sub-set or a portion or a portion of the intra-coded frames in the data stream corresponding to the smallest window are decoded and displayed while all the frames in the largest window are displayed.

What is claimed is:

1. A method of rendering a plurality of images, the plurality of images including first and second images to be displayed in first and second windows of a display device, respectively, the first and second windows being of the same size, the rendering involving the use of an image rendering resource, the method comprising the steps of:

determining which of the first and second images will require more use of the rendering resource to render;

providing the one of the first and second images to be displayed which will require the least amount of use of the rendering resource to render, a higher priority in terms of access to the rendering resource than the one of the first and second images to be displayed which will require a greater use of the rendering resource to render; and rendering at least a portion of the one of the first and second images to be displayed which is assigned the higher priority.

2. The method of claim 1, wherein the rendering resource is a processor, the determining step including the step of assessing the amount of processor time required to render the first and second images.

3. The method of claim 2, wherein the first and second images to be rendered are represented prior to image rendering in the form of encoded image data and wherein the rendering step includes the step of generating decoded imaged data.

4. The method of claim 3, wherein the step of assessing the amount of processor time required to render the first and second images includes the step of accessing information indicating the size of the first and second images represented by encoded image data prior to image rendering.

5. A method of rendering a plurality of images, the plurality of images including first and second images to be displayed in first and second windows of a display device, respectively, the rendering involving the use of an image rendering resource, the method comprising the steps of:

determining which of the first and second windows is larger;

providing the one of the first and second images to be displayed in the larger window a higher priority in terms of access to the rendering resource than the one of the first and second images to be displayed in the smaller window; and rendering at least portions of the first and second images using the rendering resource as a function of the assigned rendering priorities.

6. The method of claim 5, wherein the step of rendering includes the steps of:

rendering a first percentage of the image assigned the higher priority; and rendering an equal or lesser percentage of the image being assigned the lower priority.

7. The method of claim 5, wherein the rendering step includes the step of:

fully rendering the image assigned the highest priority amongst the plurality of images.

8. The method of claim 7, wherein the plurality of images to be rendered are represented as encoded digital image data prior to rendering;

wherein the rendering resource is a decoder; and wherein the rendering step includes the step of using the decoder to decode the encoded digital image data to generate decoded image data.

9. The method of claim 6, wherein the plurality of images includes a third image, the third image being for display in a window of a third size, the method further comprising the step of:

comparing the size of the third window to the size of the first and second window; and assigning, as a function of the size of the third window, a rendering priority to the third image.

10. The method of claim 9, wherein the second and third windows are of the same size, the method further comprising the step of:

determining the amount of at least one rendering resource required to render the second and third images; and wherein the step of assigning a rendering priority is performed as a function of the amount of the at least one rendering resource required to render the second and third images.

11. The method of claim 10, wherein the at least one rendering resource is processor time.

12. The method of claim 10, wherein the determining step includes the step of:

obtaining original image size information indicating the original size of the second and third images.

13. The method of claim 11, wherein the third image requires more processor time to render than the second image, the step of assigning a rendering priority to the third image including the step of:

assigning the third image a lower rendering priority than the second image.

14. A method of allocating image rendering resources for processing data representing a plurality of different images, each of the plurality of images to be simultaneously displayed on a display screen, each image being associated with a different one of a plurality of windows of the display screen, the method comprising the steps of:

assigning image rendering priorities to images as a function of the size of the window in which the image is to be displayed, the larger window in which the image is to be displayed, the greater the image rendering priority assigned to the image;

performing image rendering operations as a function of the image rendering priority assigned to each image, the higher the image rendering priority, the greater the probability that the image will be fully rendered; and outputting data produced by the image rendering operations to a display device.

15. The method of claim 14, wherein the step of assigning the image rendering priorities includes the step of:

comparing the sizes of the display windows.

16. The method of claim 14, wherein the step of performing an image rendering operation includes the step of:

fully rendering the image assigned the highest image rendering priority; and rendering, at most, only a portion of the image assigned the lowest image rendering priority.

17. The method of claim 14, further comprising the step of:

wherein the step of assigning image rendering priorities includes the step of assigning to images which are to be simultaneously displayed in windows of the same size, rendering priorities which are a function of processor loads associated with rendering said images.

18. The method of claim 17, wherein first and second images are to be displayed in windows of the same size, the first image requiring less processor time to render than the second image, the step of assigning image rendering priorities including the step of assigning a higher image rendering priority to the first image than is assigned to the second image.

19. The method of claim 17, further comprising the step of assessing processor loads associated with rendering images to be displayed in the same size windows.

20. The method of claim 19, wherein the step of assessing processor loads is performed using information on the original size of an image which is being rendered and the size of the window in which the image being rendered will be displayed.

21. The method of claim 14, wherein the image rendering step includes the step of:

performing a decoding operation on encoded image data representing an image to be displayed.

22. A system for rendering and display images, comprising:

a display device for simultaneously displaying a plurality of images on a display screen, each image being displayed in a different display screen window;

means for receiving encoded data representing the images to be simultaneously displayed;

a decoder coupled to the receiving means, for decoding at least some of the received encoded image data;

decoder control means for controlling use of the decoder to decode encoded image data when all of the image data to be simultaneously displayed on a display screen can not be decoded in a limited amount of time available to decode the encoded image data, the data control means giving priority in terms of decoder access to encoded data representing images as a function of the size of the image window in which the data is to be displayed, the larger the window in which the data is to be displayed, the higher the assigned priority.

23. The system of claim 22, wherein the display device is a computer monitor.

24. The system of claim 22, wherein the display device is a television set.

25. The system of claim 22, further wherein the decoder control means includes:
   means for giving priority in terms of decoder access to encoded data representing images to be displayed in the same size windows to the encoded image data which requires the least amount of decoder time to decode.

26. The system of claim 25, wherein the means for giving decoder priority includes:
   means for determining the amount of decoder time required to processes a set of encoded image data.

27. The system of claim 25, wherein the means for determining the amount of decoder time includes a database of encoded image size information.

28. A method of allocating decoder resources amongst a plurality of data streams of encoded video images, each data stream to be decoded and different window of a display having a plurality of windows, the method comprising the steps of:
   assigning the highest decoding priority to the data stream to be displayed in the largest of the plurality of windows;
   assigning, as a function of the size of the window in which the images of a data stream are to be displayed, decoding priorities to each of the remaining data streams, the larger the window in which the image is to be displayed, the higher the assigned decoder priority.

29. The method of claim 28, wherein data streams which are displayed in equal sized windows are assigned decoder priority both as a function of window size and the amount of processing resources required to decoded the encoded images in the data streams, data streams requiring a larger amount of resources to decode being assigned a lower decoding priority than data streams requiring fewer resources to decode.

30. The method of claim 28 wherein the method is further directed to using decoder resources, the method further comprising the step of decoding encoded images included in said data streams, the decoding step including the steps of:
   i. decoding all the encoded images in the data stream assigned the highest decoding priority are decoded; and
   ii. decoding only a portion of the encoded images in the lowest priority data stream are decoded.

31. The method of claim 30,
   wherein intra-coded frames included in the lowest priority data stream are decoded but not predictively or bi-directionally coded frames.

32. The method of claim 30, where an intermediate decoding priority is assigned to one of the data streams, the intra-coded and at least some predictively coded frames included in the data stream assigned intermediate decoding priority being decoded but not bi-directionally coded frames.

* * * * *